INVENTOR.
ABRAHAM KOGAN

INVENTOR.
ABRAHAM KOGAN

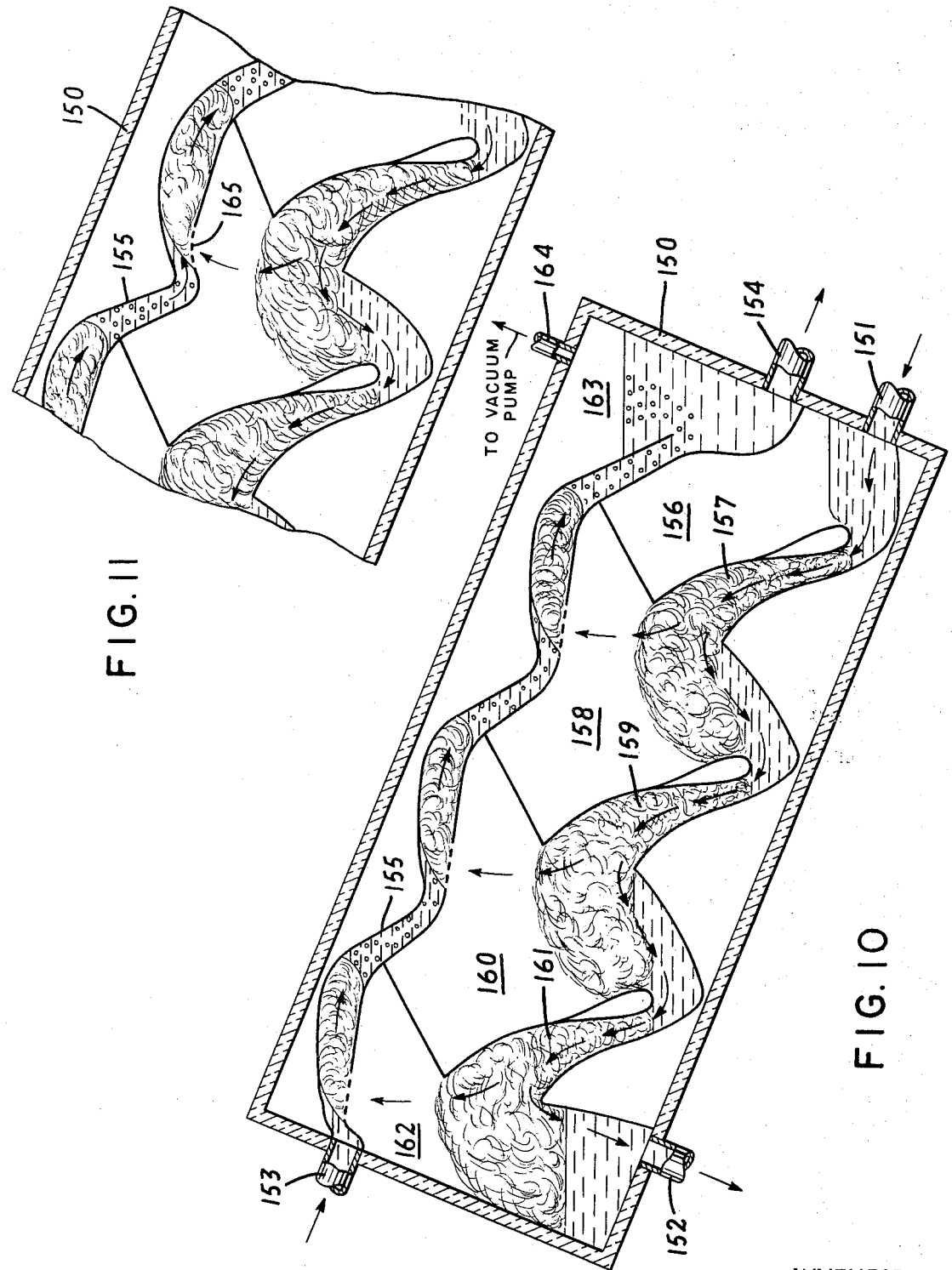

United States Patent Office 3,830,706
Patented Aug. 20, 1974

3,830,706
HEAT AND MASS TRANSFER BETWEEN TWO LIQUIDS OF DIFFERENT VAPOR PRESSURE VIA A COMMON VAPOROUS COMPONENT
Abraham Kogan, 35a Trumpeldor Avenue,
Neve Shaanan, Haifa, Israel
Continuation-in-part of Ser. No. 11,808, Feb. 16, 1970, which is a continuation-in-part of Ser. No. 755,220, Aug. 26, 1968, both now abandoned. This application Oct. 10, 1971, Ser. No. 188,457
Claims priority, application Israel Oct. 1, 1967 28,707; May 15, 1968 29,999
Int. Cl. B01d 1/28, 3/00, 3/02, 3/10
U.S. Cl. 203—11                                    4 Claims

ABSTRACT OF THE DISCLOSURE

A process and apparatus for transferring heat and/or mass from a stream of homogeneous liquid of higher vapor pressure to another stream of liquid of lower vapor pressure. The process comprises the steps of flowing the liquid of lower vapor pressure along a channel which includes an apertured partition, flowing solely the homogenous liquid of higher vapor pressure along a second channel which is separated from the apertured partition by a vapor transfer region, and evolving a vapor from the liquid of lower vapor pressure. The vapor evolved vapor transfer region beneath the apertured partition, a vapor pressure higher than the hydrostatic pressure of the liquid of lower vapor pressure. The vapor evolved from the liquid of higher vapor pressure is thereby introduced into the liquid of lower vapor pressure through the apertured partition while preventing the downward flow of the liquid of lower vapor pressure through the apertured partition.

REFERENCE TO RELATED APPLICATIONS

This application is a continuation-in-part of the application Ser. No. 11,808, filed Feb. 16, 1970 by Abraham Kogan which, in turn, is a continuation-in-part of the application Ser. No. 755,220, filed Aug. 26, 1968 by Abraham Kogan, both abandoned.

BACKGROUND OF THE INVENTION

The present invention relates to improvements in the transfer of heat and/or mass from a homogeneous liquid of a higher vapor pressure to another liquid of lower vapor pressure.

More particularly, the present invention relates to the transfer of heat and/or mass between a first liquid stream, which is a solution, to a second liquid stream. The first liquid stream increases in concentration and decreases in temperature while imparting heat and mass to the second liquid stream.

An illustration of one type of heat and/or mass transfer system to which the present invention relates is described in the U.S. Pat. No. 3,337,419 to Kogan. This patent describes a distillation system in which a stream of salt water or brine at higher temperature and a stream of fresh water at lower temperature flow side by side in open communication with the same low pressure, so that water vapor is evolved from the salt water and condensed on the surface of the fresh water stream.

Although this type of distillation system is both effective and efficient, it has been found that with the condensation of the vapor on the surface of the cooler liquid, a thin warm localized barrier layer of non-condensable gases is formed on the surface, and this layer tends to insulate the bulk of the cooler liquid below from the vapors above, thereby obstructing the vapor flow and reducing the rate of condensation.

Furthermore, it has been found that the directional flow of the vapor to the upper surface of the condensing liquid hinders the diffusional removal of noncondensable gases from the condensing liquid surface, and after a short time, a relatively high concentration of such gases is built up close to the surface of the liquid which inhibits the condensation of the vapor thereon.

In an actual experiment in which two streams of water with initial temperatures of 31.0° C. and 26.8° C., respectively, were allowed to flow countercurrently in adjacent channels through an evacuated enclosure, it has been found that even when using water deaerated to containing less than 0.2 p.p.m. oxygen, traces of noncondensable gases accumulated in the vicinity of the free surface of the cooler water stream, strongly inhibiting vapor condensation. The measured concentration of noncondensable gases near the cold water surface was about 40 times higher than the concentration measured at a distance of 10 cm. above this surface. Half an hour after start of the experiment the concentration of noncondensable gases at the cold water free surface attained the value of 60,000 p.p.m. When this thin concentrated layer of noncondensable gases was sucked away artificially the rate of condensation went up immediately.

It is possible to avoid the necessity for penetration of a gaseous barrier overlying the surface of the liquid condensate by the vapor evolved from the liquid to be distilled by introducing the vapor into the condensate from below. Apparatus for effecting heat and/or mass transfer in this manner is disclosed in the U.S. Pat. No. 2,749,094 to Lewis and Gilliland and in the U.S. Pat. No. 3,298,932 to Bauer.

The system of Lewis et al. includes an air-evacuated chamber which is separated into upper and lower regions by an apertured partition. A "cold liquid" is caused to flow through the upper region across the apertured partition and "warm liquid" caused to flow through the lower region beneath the apertured partition. The level of the stream of warm liquid is made sufficiently low so that a vapor transfer region exists between this stream and the apertured partition. Finally, an inert gas is pumped into the lower region at a point beneath the level of the warm liquid so as to increase the pressure in the vapor transfer region and prevent the cold liquid from dripping downward into the lower region through the apertured partition. The inert gas passes upward through the apertured partition and through the cold liquid and is removed from the upper region, together with any noncondensable gases which may have accumulated there, by a vacuum pump.

The Bauer system is similar to the system of Lewis et al. except that an inert gas is not used to prevent the cold liquid from dripping downward through the apertured partition. In this case, the warm liquid is mixed with a heated immiscible heat transfer liquid to increase its temperature and cause it to flash. The flashing process enables the warm liquid to yield sufficient vapor to maintain the cold liquid above the apertured partition.

The heat and/or mass transfer system of Lewis et al. and Bauer afford a considerable improvement in efficiency over the system of Kogan disclosed in the above-mentioned Pat. No. 3,337,419. Since the vapor evolved from the warm liquid or lower stream is introduced into the cold liquid or upper stream beneath the surface thereof, this vapor rises through the upper stream and makes contact with the entire bulk of the upper stream thereby greatly increasing the heat transfer surface. The very penetration of the vapor bubbles into the cold liquid results in the rapid and continuous renewal of the contact surface between the vapor and the cold liquid. This rapid renewal of the surface contact is actually enhanced by the sheer forces at the boundary layers between the bubbles and the surrounding liquid.

Furthermore, since the evolved vapor rises through the cold liquid from below the upper surface thereof, the noncondensable gases can no longer accumulate in steadily increasing concentrations to form a barrier to the heat and/or mass transfer. Instead, the noncondensable gases move under their own buoyancy to the surface of the cold liquid where they can be removed without interference with the transfer and without removal of an appreciable amount of condensable gases therewith.

Particularly when a heat and/or mass transfer system is used for water distillation to produce fresh water from salt water or brine, even a small increase in efficiency is economically significant. In this case, extremely large quantities of liquid (water) must be processed so that an increase in efficiency of whatever magnitude results in an enormous saving of energy.

The heat and/or mass transfer system of Lewis et al. and Bauer, although more efficient than the aforementioned system of Kogan, suffer the disadvantage that they require large temperature differences between the cold and the warm liquid streams to effect a reasonable rate of vapor transfer. In the system of Lewis et al., the presence of the inert gas in the vapor condensation region of the cold stream is the cause of much resistance to the free flow of vapor molecules toward the condensation surface. The condensation process is thereby impeded and the rate of vapor condensation for a fixed temperature difference between the two liquid streams is decreased.

A similar adverse situation is encountered in the evaporation process of Bauer's system. The process of evaporation from droplets of a warm liquid dispersed in a secondary heated immiscible liquid depends upon the continuous supply of heat from this secondary liquid through the evaporating droplets. The flash evaporation in Bauer's system is controlled by the resistance to heat transfer between the two immiscible liquid phases. This again results ultimately in the necessity of large temperature difference driving forces and a correspondingly reduced efficiency of the process.

Another disadvantage of the system of Bauer, particularly when used to distill salt water, is the lack of purity of the condensed product. As noted above, the Bauer system requires the introduction of an immiscible heat transfer liquid together with the warm liquid to be distilled into the lower region beneath the apertured partition. During the chaotic process of flash evaporation of the warm liquid as it passes from stage to stage, some of the immiscible liquid is broken up into minute droplets. These droplets are entrained with the vapor produced by the warm liquid and are carried upward through the apertures into the upper stream of cold liquid or condensate. Although normally it would be a simple matter to separate an immiscible liquid from the condensate, the droplets of immiscible liquid in this case are so small as to form an emulsion. The separation of an emulsion is a costly operation and can hardly be done economically in applications such as the desalinization of sea water.

In short, the water condensate produced by the system of Bauer will be contaminated by the minute droplets of immiscible liquid and will not, without purification, meet the standards of cleanliness established for drinking water. These standards can only be met by the separation of an emulsion: a difficult and costly operation.

SUMMARY OF THE INVENTION

An object of the present invention, therefore, is to provide a process and apparatus for transfering heat and/or mass from one liquid to another, which process and apparatus are more efficient than the heat and/or mass transfer systems described in the above-mentioned patents.

More particularly, an object of the present invention is to transfer mass from one liquid to another in the form of vapor with a minimum degradation of heat in the process; i.e., to attain high rates of vapor mass transfer between the two liquids with as small as possible a temperature difference between them serving as the driving force for this mass transfer.

These objects, as well as other objects which will become apparent in the discussion that follows, are achieved, according to the present invention, by flowing a liquid of lower vapor pressure along a channel which includes an apertured partition on the floor thereof and flowing solely a stream of homogeneous liquid of higher vapor pressure along a channel which is separated from the apertured partition by an open region permitting the transfer of vapor from the liquid of higher vapor pressure to the liquid of lower vapor pressure.

As is the case with any liquid having a free upper surface, the homogeneous liquid of higher vapor pressure will evolve a vapor that builds up in the vapor transfer region beneath the apertured partition. The difference in vapor pressures between the liquid of higher vapor pressure and the liquid of lower vapor pressure is chosen (e.g., by controlling the temperatures of the two liquids) so that the vapor pressure in the vapor transfer region will be higher than the pressure above the liquid of lower vapor pressure plus the hydro-static pressure of the liquid of lower vapor pressure. This vapor, which has been evolved from the liquid of higher vapor pressure, will thus prevent the downward dripping of the liquid of lower vapor pressure through the apertured partition and will flow upward through the apertured partition into the liquid of lower vapor pressure and there condense.

It should be emphasized that only the homogeneous liquid of higher vapor pressure is introduced into the channel or region beneath the apertured partition. The system according to the present invention is thus distinguishable from the systems of Lewis et al. and Bauer which introduce, respectively, an inert gas and an immiscible liquid phase into this region. The term "homogeneous liquid," as used herein, is intended to define a liquid containing but a single miscible liquid phase; e.g., a true solution as contrasted with an emulsion or a dispersion.

In order to achieve an operative system in which the vapor pressure built up in the vapor transfer region beneath the apertured partition is higher than the pressure above the liquid of lower vapor pressure plus the hydro-static pressure of the liquid of lower vapor pressure, it is necessary to maintain a difference in temperature between the two liquid streams. As the two streams flow, preferably but not necessarily in counter-current direction, the liquid stream of higher vapor pressure will be cooled while the liquid stream of lower vapor pressure will be heated, thus providing a transfer of heat from the stream of higher vapor pressure to the stream of lower vapor pressure. If the vapor evolved from the liquid of higher vapor pressure is condensable within the stream of lower vapor pressure, there will also be provided a transfer of mass from the stream of higher vapor pressure to the stream of lower vapor pressure.

In a preferred embodiment of the invention, the liquid of lower vapor pressure is an overhead stream and the liquid of higher vapor pressure is an underneath stream. A plurality of heat and/or mass transfer stages are accommodate within a single apparatus housing by subdividing the housing into a plurality of chambers. Also, successive housings are connected one with another so that the two liquid streams flow from stage to stage and from housing to housing with the cooler overhead stream flowing through successive stages or chambers within each housing by gravity and the warmer lower stream flowing through successive stages or chambers within each housing at least partially against gravity under a driving force which results from the temperature and pressure differentials between successive chambers or stages.

To obtain maximum efficiency flow of the vapor from the underneath to the overhead stream through the apertured partition, it is desirable to reduce as much as possible pressure losses encountered by the vapor stream flowing through the apertures. According to the present invention such pressure losses can be reduced by the shape of the apertures. Any solid protuberances on the upper surface of the apertured plate, such as risers or slotted caps, are avoided. In preferred embodiments of the present invention the apertures have a tapering, conical or bell shape, with larger area inlets and smaller area outlets. Also, the axes of the apertures are directed at an acute angle to the plate of the partition in a direction downstream of the flow of the overhead stream. The vapor passing through each aperture is thus directed with the general flow direction of the overhead stream, and the disturbance to the flow is minimized. Moreover, the momentum of the vapor stream is not lost completely, so that it is transferred to a large extent to the overhead liquid stream.

In order to obtain an overall high rate of passage of gas through the apertured partition it is desirable that the gaseous stream flow uniformly and continuously through all of the apertures. Greater stability and uniformity of flow through the apertures can be obtained by insuring supercritical channel flow of the overhead stream. Under such flow conditions the disturbances introduced into the liquid stream by the penetration of the gaseous stream through any aperture will not be transmitted upstream, and will not, therefore, influence flow conditions through apertures siturate upstream.

In applications of the present invention in which heat as well as mass is transferred from one liquid to another, it may be desirable to recapture and efficiently utilize this heat by bringing the heated liquid into heat exchange relationship with the other liquid to preheat the latter. This can be accomplished in using a conventional heat exchanger in which the two liquids are brought into out-of-contact heat exchange relationship with each other. In another embodiment of the present invention, a solid heat-transfer medium is utilized to exchange heat between the two liquids, first by direct contact with one and then with the other, thereby increasing the efficiency of the system.

The smaller the drop in vapor temperature in passing from one liquid stream to the other, the more complete will be the heat recovery of the system of the present invention. The smaller the difference in temperature between the two liquid streams, the less will be the heat per unit mass of product rejected to the outside at the low temperature end of the system and, consequently, the less additional heat will be required from an external source at the high temperature end of the system.

The efficiency of the system of the present invention is therefore dependent upon the rate of vapor condensation which may be maintained with a given temperature difference between the two liquid streams. Due to the absence of an inert gas or an immiscible liquid in the region beneath the apertured partition, the transfer of vapor between the liquid of higher vapor pressure and the liquid of lower vapor pressure is not impeded in any way so that, given a sufficient temperature difference to operate the system, the rate of vapor condensation will be greater than that in the systems of Lewis et al, and Bauer. In short, the system of the present invention will be more efficient than the systems of the prior art.

Another advantage of the present invention vis-a-vis the system of Lewis et al. is the elimination of the apparatus, required by Lewis et al., for continuously introducing the inert gas into the channel region beneath the apertured partition.

Another advantage of the present invention vis-a-vis the system of Bauer is a greater purity in the condensed product. As explained above, the system of Bauer requires the introduction of an immiscible heat transfer liquid together with the feed solution into the channel region beneath the apertured partition. Due to the chaotic process of flash evaporation, the immiscible liquid is partially broken up into minute droplets, some of which pass upward through the apertures into the upper liquid stream, contaminating the condensate. Because only a homogeneous liquid is used as the liquid of higher vapor pressure in the system of the present invention, the condensate will be so pure as to require no filtration or other subsequent processing prior to use.

Still another advantage of the present invention vis-a-vis the system of Bauer is that, due to the absence of an immiscible liquid, the liquid of higher vapor pressure is allowed to flash evenly and continuously as it passes from stage to stage. With the system of Bauer, where an immiscible liquid is introduced together with the feed solution into the channel region beneath the apertured partition, the liquid of higher vapor pressure will tend to separate out from the immiscible liquid along the tortuous path through the multi-stage housing due to buoyancy and due to the centrifugal force at the turns. As a result, large droplets of the liquid of higher vapor pressure will tend to coalesce in the upward flowing stream and the supply of heat from the immiscible liquid to the drops of the liquid of higher vapor pressure will be hindered. Moreover, since the immiscible liquid is not itself capable of flashing, if a substantial amount of the liquid of higher vapor pressure is allowed to separate from the immiscible liquid, it will be difficult to maintain the flow of immiscible liquid through the flashing risers and, eventually, as the immiscible liquid is collected in the intermediate stages of the apparatus, the upward flow of all liquid will be halted entirely.

BRIEF DESCRIPTION OF THE DRAWINGS

FIG. 10 is a schematic drawing illustrating a further form of multiple stage housing; and FIG. 11 is a fragmentary schematic drawing illustrating a still further form of multiple stage housing

DESCRIPTION OF THE PREFERRED EMBODIMENTS

Although the present invention is applicable generally to systems in which a gas can be evolved from one underneath liquid stream and transferred to another overhead liquid stream to transfer heat and/or mass thereto or react therewith, it is described herein in the form of a distillation system in which water vapor is evolved from a salt water stream and condensed in a fresh water stream to transfer both heat and mass to the fresh water stream.

Figure 1:
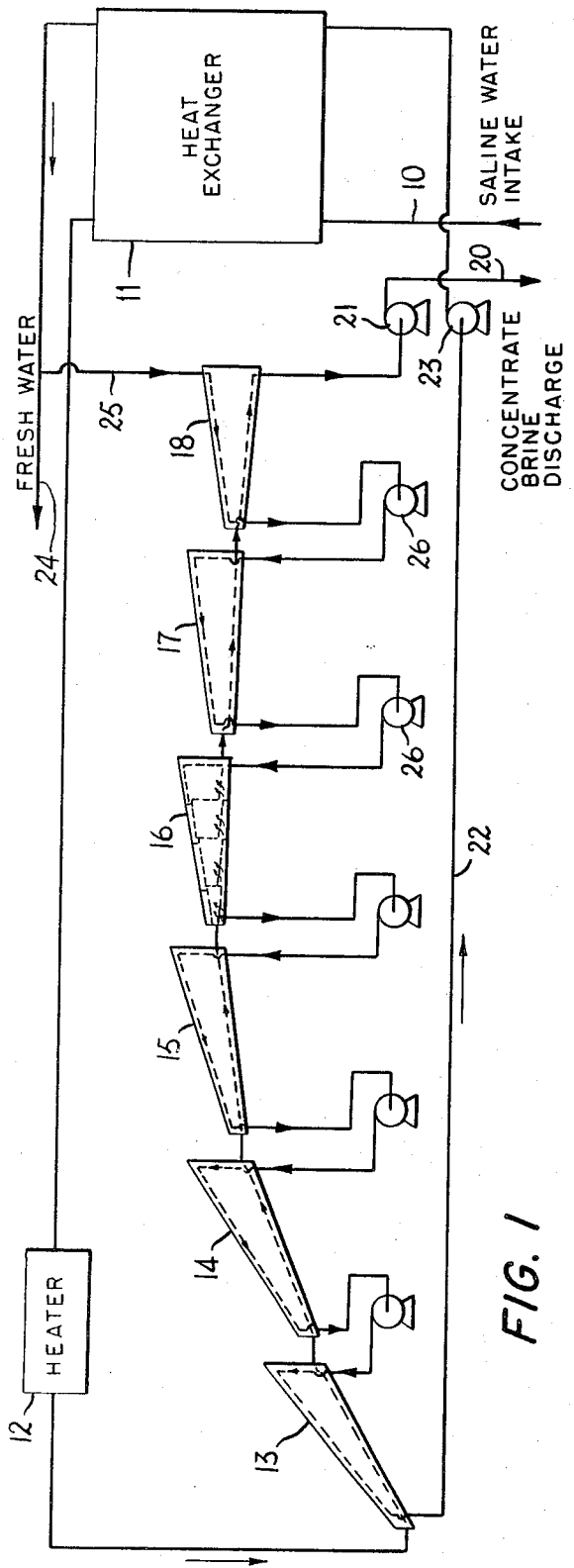
FIG. 1 is a schematic side elevation of the heat and/or mass transfer apparatus of the present invention.

In the distillation apparatus illustrated in FIG. 1, the saline water to be distilled is introduced into the distillation system through an intake 10, heated in a heat exchanger 11 and in a heater 12, fed *seriatim* through a plurality of housings or enclosures 13, 14, 15, 16, 17 and 18 wherein water vapor is evolved therefrom and converted into fresh water before the more concentrated saline water is discharged through a conduit 20 by a pump 21.

The fresh water condensed from the vapor evolved from the saline water flows through these housings *seriatim* but in a countercurrent direction to the flow of the saline water. Upon discharge from the housing 13, the converted fresh water is carried through a conduit 22 by a pump 23 to heat exchanger 11 in which it is brought into heat exchange relationship with saline water intake to heat the latter. The converted fresh water is then, in part, carried to storage by a conduit 24 and, in part, returned to the housing 18 by a conduit 25 to repeat the cycle. The pumps 26 assist in carrying the fresh water from the lower level discharge of one housing to the higher level inlet of the succeeding housing.

Figure 2:
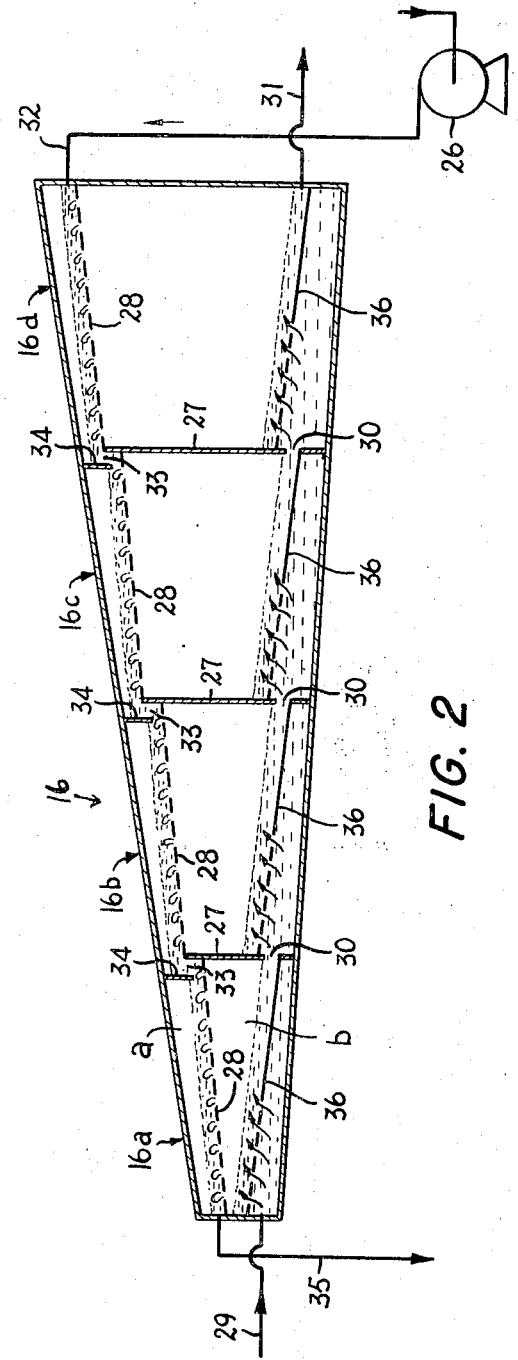
FIG. 2 is a schematic side elevation in cross-section showing one of the multiple stage housings illustrated in FIG. 1.

The housings 13 through 18 are of generally trapezoidal shape and are oriented at appropriate angles for reasons which will be explained below. The interiors of these housings are of similar construction. A typical housing, for example the housing 16 illustrated in FIG. 2, is subdivided into a plurality of stages 16a, 16b, 16c and 16d by vertical partitions 27. Each stage, in turn, is subdivided into upper and lower sections a and b, respectively, by means of an apertured partition 28. The partitions 28 cooperate with the side walls of the housings to form a series of flow channels for the fresh water.

The warmer salt water or brine enters the housing 16 at the left through a conduit 29, passing into the lower section b of the stage 16a. The brine continues to flow through the stages 16a, 16b, 16c and 16d in sequence, passing from stage to stage through a restricted passage 30 in the lower end of each of the vertical partitions 27. The brine ultimately is discharged from the last stage 16d through a conduit 31 which carries the brine to the next housing 17.

The cooler overhead stream of fresh water enters the housing at the right through a conduit 32 and flows by gravity through the stages 16d, 16c, 16b and 16a in sequence, passing from stage to stage through a restricted passage 33 defined between the upper end of the vertical partition 27 and a baffle 34 depending from the top of the housing and spaced apart from the top of the partition 27 in a downstream direction. The downstream declination of the flow channels through each of the successive stages maintains a shallow stream flow at a supercritical rate of flow. The fresh water ultimately is discharged from the last stage 16a through a conduit 35 which carries it to the next housing 15.

Although not shown in the drawings, air and noncondensable gases are evacuated from the upper regions of each of the stages within the housing 16, maintaining very low pressure in the interiors thereof The stages, however, are sealed off from each other by the passage of the liquid streams through the restricted passages 30 and 33.

The heated saline water flows from stage to stage within the housing against gravity. Toward this end a plate 36 downwardly inclined in a downstream direction is accommodated within each of the stages of the housing and cooperates with the side walls of the housing to form a flow channel for the saline water. The saline water enters the lower section b of the stage 16a beneath the left end of the plate 36. The plate 36 is perforated, at least at the left end thereof, and because of the low pressure in the section b, the saline water penetrates in a fountain-like manner through the apertures in the plate 36, flashing into vapor and carrying the saline stream across the upper surface of the plate while vapor is evolved from the saline stream. Since there is a countercurrent flow of relatively cool water passing across the upper surface of the apertured partition 28, the vapor flows upwardly, passing through the apertures in the partition 28 and condenses within the fresh water stream. The noncondensable gases pass upwardly through the upper stream into the low pressure region in the upper section a from which they are evacuated by suction means.

As a result of the decrease in temperatures of the saline water and the consequent decrease in the vapor pressures in the successive stages, the saline stream passes from stage to stage through the apertures 30 and against the influence of gravity, as described in the above-mentioned patent. Since there is a saturated vapor pressure in each stage, when the saline water flows into the next stage at lower pressure the consequent cooling of the saline water evolves vapor, so that in each stage both heat and mass are transferred from the lower warmer stream to the upper cooler stream.

In order to ensure that the rate of downward flow of the cool overhead water stream under gravity is equal to the rate of upward flow of the warm underneath saline water stream under the vapor pressure driving force, and that there is no undue accumulation or deeping of either stream, and bearing in mind the influence of friction, the overhead and underneath streams will diverge in the downstream directions of the saline stream and hence the housings 13 through 18 are preferably of trapezoidal shape. In order to limit the divergence of the two streams, the distillation of the saline water is carried on in a succession of different housings, as described above. The declination of the flow channels in each of the stages makes it possible to maintain both streams at equal rates of flow and at shallow depths. This in turn dictates the angle of orientation of the housing.

The vapor pressure established in the vapor transfer region of each stage is sufficiently high to overcome the hydrostatic head of pressure presented by the overhead shallow stream of converted water, and in consequence the overhead stream continues to flow across the apertured flow channel under the influence of gravity instead of percolating downwards into the lower section b.

Various considerations govern the choice of the size, the shape and the distribution of the apertures in the transverse partitions 28 between the upper and lower sections of each distillation stage. On the one hand, these apertures must have a large enough overall area to allow for the effective penetrations of the vapor into the body of the converted water stream flowing on the apertured partition. On the other hand, the diameter of each aperture must be limited so as to avoid downflow of the converted water stream through the apertures.

The overall area of the apertures depends both on the number of apertures per given area and on the size of each aperture. While theoretically it would be desirable to distribute the apertures as closely together as possible, a limiting factor is that when the apertures are too close together it is found that the bubbles of vapor which pass through these closely spaced apertures into the converted water stream tend to coalescence into a single large bubble which often passes straight through the converted water stream without condensing.

In practice it has been found that with water temperatures which range between 30° C. and 60° C. this danger of coalescence of vapor bubbles, with the consequent noncondensation thereof, is very considerably reduced with apertures whose diameters are less than 1.5 mm. and which are so distributed as to have their centers spaced from each other by distances which are not less than 15 mm. Similarly, with apertures of such size and distribution no difficulty has been experienced in preventing the downflow of the converted water stream under its own hydrostatic pressure and against the vapor pressure developed in the evaporating chamber. On the contrary, effective penetration of the vapor through the apertures and into the converted water stream has been found to take place.

Figure 3:
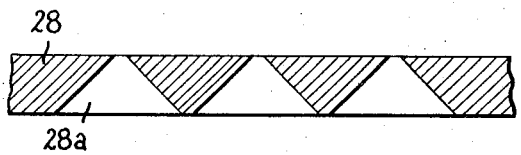
FIGS. 3, 4 and 5 are longitudinal cross-sectional views of different forms of gas transfer apertures for use in the apparatus shown in FIGS. 1 and 2.

It has furthermore been found to be advantageous to give the aperture a tapering, conical or bell shape. FIG. 3 shows the apertures 28a in tapering, conical form, and FIG. 4 shows the apertures 28b in bell shaped form.

These shapes reduce resistance to upward flow of vapor. They also have the beneficial effect of affording increased resistance to flow (i.e., escape) of overhead liquid through the apertures when starting the process.

Figure 4:
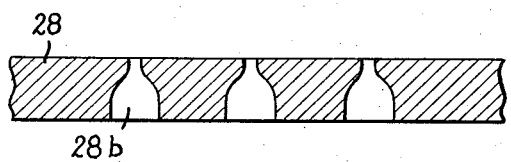
Figure 5:
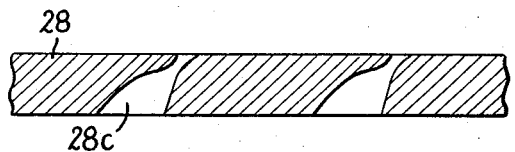

In contrast to the embodiments shown in FIGS. 3 and 4 where the axes of the apertures are substantially normal to the plane of the partition, in the embodiment shown in FIG. 5 the axes of the apertures $28c$ are directed at an angle to the plane of the partition and in the same general direction as the direction of flow of the converted water stream thereon. The vapors thus flow into the liquid in the direction of flow thereof so that the momentum of vapor flow is not completely lost and is partially transmitted to the converted water stream. Furthermore, the vapor bubbles emerging from such inclined apertures tend to be elongated and inclined to the horizontal and thereby present an extended contact surface to the converted water stream so as to facilitate condensation.

Apertures having axes inclined to the plane of the partitions will also offer increased resistance to the downflow of the converted water stream for the reason that for such downflow to take place the converted water stream must change its direction of flow by an angle of almost 180°.

Figure 6:
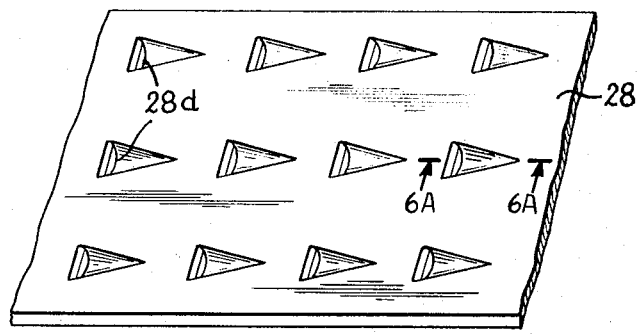
FIG. 6 is a schematic perspective view of still another form of gas transfer aperture.
Figure 6A:
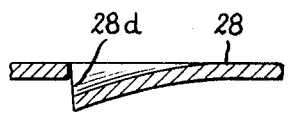
FIG. 6A is a cross-sectional view taken along the line 6A—6A of FIG. 6.

FIGS. 6 and 6A show another form of aperture $28d$ with inclined axis which can be readily punched or molded from metal or plastic material.

The partitions should preferably be insulated or made from insulating material to prevent the vapor from condensing on the undersides thereof.

In an example of the present invention using a single housing divided into four stages, the converted water stream was introduced into the housing in the last stage at a temperature of 38.8° C. while the heated saline water stream was introduced into the system in the first stage at a temperature of 44.7° C., the rate of flow of each of the streams being 15 liters per minute. It was found that the converted water stream was discharged from the housing at the first stage at a temperature of 41.2° C., i.e., it had undergone an increase in temperature of 2.4° C. while the heated saline water stream had undergone a decrease in temperature of similar magnitude.

In this experiment both the upper apertured partitions 28 and the lower perforated plates 36 were inclined at 2° to the horizontal, maintaining flows in supercritical condition. The flow of vapor through the apertured partitions was stable and uniform.

In this experiment the rate of transfer of vapors from the warm stream to the cool stream per total unit volume and per unit difference of inlet temperatures of the two streams amounted to $$32 \frac{kg.}{hr. m^3. °C.}$$

In the heat and/or mass transfer method and equipment in accordance with the present invention there is a large effective area of contact between the converted water stream and the condensing vapor. Also, the fact that the vapor bubbles penetrate into the body of the converted water stream results in the rapid and continuous renewal of the surface of contact beween the liquid and vapor, this being enhanced by the shear forces present in the boundary layer near the interface between the vapor bubbles and the surrounding liquid.

The present system lends itself to a continuous drain-off of noncondensable gases from above the overhead stream. Since the bubbles of these noncondensable gases form at the top of each vapor bubble, the bubbles of noncondensable gas ultimately detach themselves from the condensable bubbles and are carried by buoyancy towards the upper surface of the converted water stream. This is in contrast to a system of the type described in the previously mentioned U.S. Pat. No. 3,337,419 to Kogan wherein the condensation of the vapor at the free surface of the cool stream is accompanied by the formation of a concentrated layer of noncondensable gases at the interphase, thereby tending to inhibit the continued condensation of the vapor.

The use of tapered conical or bell shaped apertures in the partition between evaporator chamber and condenser chamber, with their longitudinal direction inclined to the plane of the partition, ensures heat and/or mass transfer with minimum pressure losses. Moreover, the inclination of the apertured flow channel for the overhead stream to produce supercritical channel flow ensures stable and uniform vapor penetration through the partition, so that vapor will flow simultaneously through all the partitions at a substantially equal rate.

Since in the present system only the homogeneous liquid of higher vapor pressure—e.g., the brine solution—is admitted into the lower sections $b$ beneath the apertured partitions, there is no resistance to the free generation and upward flow of vapor. This is in contrast to systems of the type described in the previously mentioned U.S. Pat. Nos. 2,749,094 and 3,298,932 to Lewis et al. and Bauer, respectively, which require an inert gas or an immiscible liquid to be introduced into this channel region, thereby inhibiting the transfer of vapor. As a result, the system of the present invention is considerably more efficient than either of these prior art systems.

Finally, due to the absence of an immiscible liquid in the liquid of higher vapor pressure, the system of the present invention produces a condensate of the highest purity. In the system described in the above-identified patent to Bauer, minute droplets of the immiscible liquid find their way into the condensate from the region beneath the apertures producing a cloudy emulsion which is unacceptably impure for certain purposes. When the system is used for the production of drinking water, for example, the traces of immiscible liquid must be separated from the condensate by special emulsion-separating techniques. When the system of the present invention is employed for this purpose, the condensate can be used directly as drinking water without intermediate purification.

The system of the present invention is adaptable to the system described in the above-identified patent to Kogan wherein the heated saline water stream is raised from stage to stage by the driving force which arises out of the difference in vapor pressure between the stages. In such an arrangement therefore the vapor pressure is used both to overcome the hydrostatic head of the cool liquid stream and to propel the saline water stream from stage to stage against the influence of gravity.

In the embodiment shown in FIGS. 1 and 2, the housings or enclosures were of trapezoidal shape to insure that the overall direction of gravity flow of the converted water has a steeper inclination as compared with the overall direction of flow of the saline water which is partially against gravity under the driving force exerted by the vapor pressure. This divergence between the overall directions of flow of the two streams is provided for in order to take care of frictional losses of the streams. The trapezoidal shape of the enclosure limits the number of stages in each enclosure and requires pumps to be provided between enclosures to lift the converted water stream from the discharge of one enclosure to the intake of the next.

Figure 7:
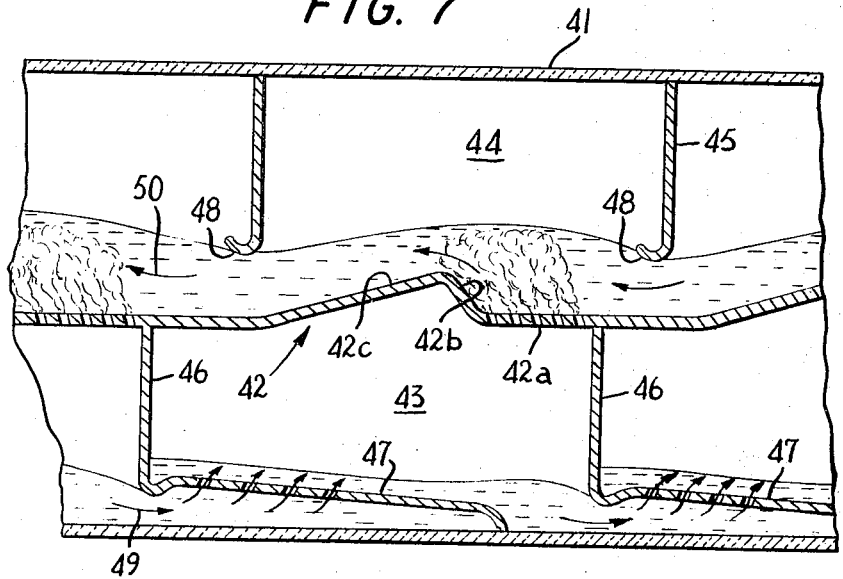
FIG. 7 is a fragmentary side elevation in cross-section showing an alternative embodiment of multiple stage housing.

The housing structure shown in FIG. 7 of the drawings can be adopted to avoid or reduce the overall divergence of the two streams. This is achieved by the design of the housing to recover part of the momentum imparted by the vapor flow to the converted water stream while insuring equal rates of flow of the two streams.

The housing 41 shown in FIG. 7 has parallel upper and lower walls and is divided by a partition 42 into a lower evaporation section 43 and an upper condensation section 44. The condensation section 44, in turn, is divided by means of vertical partitions 45 into successive condensation stages. Similarly, the evaporation section 43 is divided by vertical partitions 46 into successive evaporation stages.

Each vertical partition 46 is formed integrally with a perforated longitudinally extending plate 47 which slopes downwardly in a downstream direction. Also, the lower end of each vertical partition 45 terminates in a curved lip or flange 48 which extends in a downstream direction. The lower curved surface is spaced from the upper surface of the partition 42 to form a flow passage from one section to the next.

Between successive vertical partitions 45 the longitudinally extending partition includes a substantially horizontal apertured portion 42a, a short rising upper surface 42b downstream of the portion 42a, and a longer descending upper surface 42c downstream of the portion 42b.

In operation, the saline water stream 49 flows through the evaporator stages in a manner similar to the flow of the saline water in the embodiment described above in connection with FIG. 2, and at the same time the converted water stream 50 flows in a countercurrent direction through the condenser stages. In this embodiment however, the vapor which passes from an evaporator to a condenser stage through the apertured portion 42a transfers sufficient momentum to the converted water stream so as to cause it to climb the rising surface 42b.

The perforated portion 42a is shown as horizontally disposed, but it can be given a slight upward slope. The upper surface 42a can also be curved in concave fashion so as to achieve an even flow of vapor through the apertures, thereby insuring an effective control on the thickness of the liquid layer on this portion 42a.

This modification reduces or eliminates the divergence between the overhead and underneath streams and eliminates the necessity to provide for pumping between stages or groups of stages.

Figure 8:
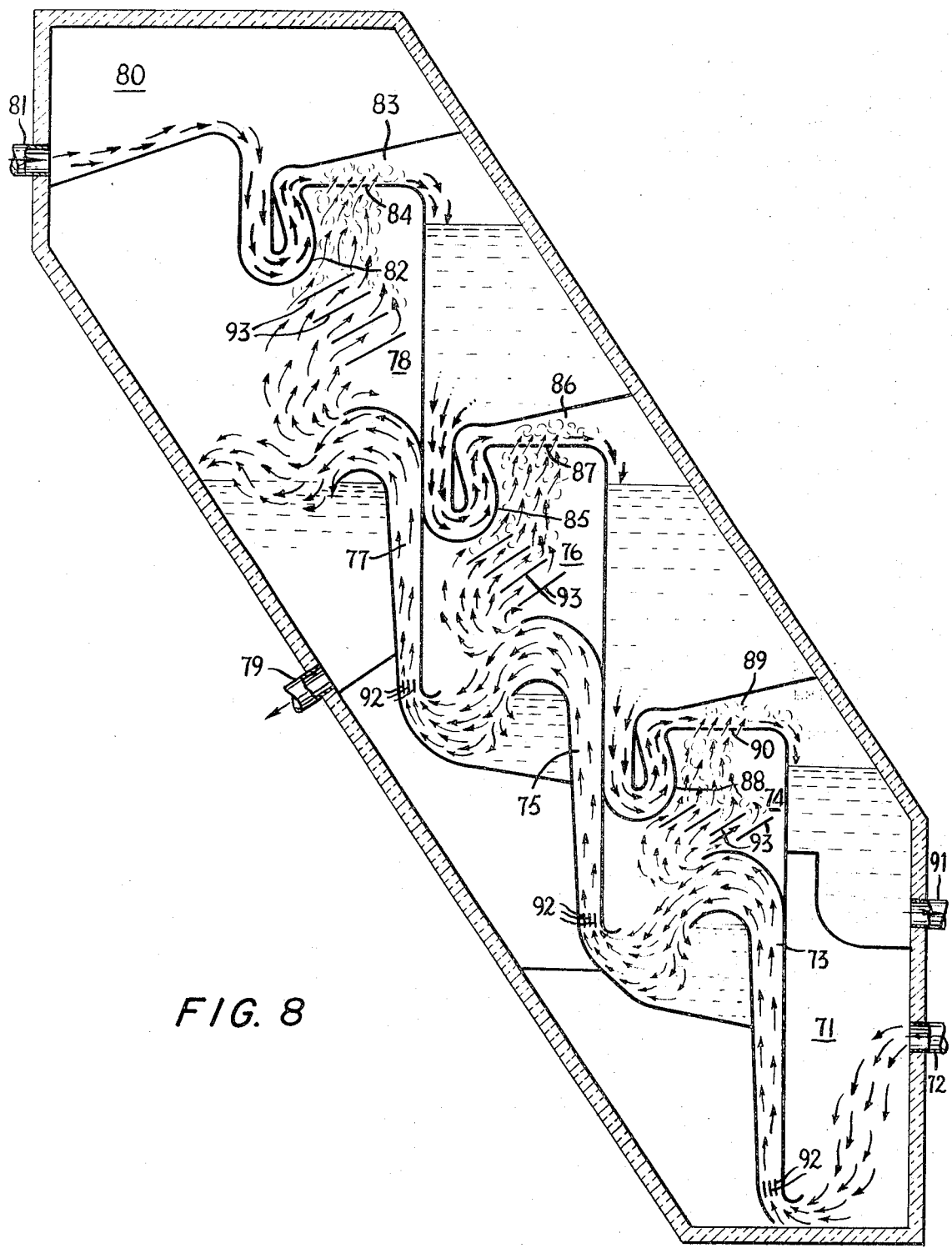
FIG. 8 is a schematic drawing illustrating another form of multiple stage housing.

A form of diagonally extending housing or enclosure 70 for the upper and lower streams is shown in FIG. 8 of the drawings. In this embodiment the saline water or liquid from which a gas is to be evolved enters a lower region 71 of the housing through an inlet passage 72, flows upwardly through a diverging riser 73 of diverging cross-sectional area to a first stage chamber 74, through a diverging riser 75 to a second stage chamber 76, then through a diverging riser 77 to a third stage chamber 78, then out a discharge passage 79 in the lower region of the chamber 78.

The fresh water or liquid to which the mass and/or heat is to be transferred flows in countercurrent direction into an upper region 80 of the housing through an inlet passage 81, and then through a U-shaped passage 82 to a flow passage 83 which is in communication with the chamber 78 through perforations 84. The fresh water then continues its flow downwardly through a U-shaped neck 85 to a flow chamber 86 which is in communication with the chamber 76 through perforations 87, through a U-shaped passage 88 to a flow passage 89 which is in communication with the chamber 74 through perforations 90 before it is discharged from the housing through the outlet passage 91.

The upper regions of the flow channels 83, 86 and 89 are maintained at lower pressures than the vapor pressures in the regions 78, 76 and 74, respectively. As in the embodiments illustrated in FIGS. 2 and 7, the vapor evolved in each of the stages 74, 76 and 78 rises, passes through the apertured flow channel for the upper stream, condensing therein to become part of the upper stream. Although only three stages are shown in the housing 70, a commercial system would include many more stages.

In the operation of the embodiment of FIG. 8, use is made of the dynamic lifting effect of the flashing saline water to supply the energy to lift the saline water from stage to stage. More specifically, as the saline water passes from a lower stage to the next higher stage through the vertical riser, the flashing vapor evolved therefrom as it travels to the upper chamber at lower vapor pressure provides a dynamic lifting force which supplements the static lifting force produced by the pressure differential between successive stages. The riser is designed to increase in cross-section from the bottom to the top to encourage flashing of vapor and to avoid acceleration of the saline water and vapor and thereby avoid or minimize loss of energy.

In order to promote or induce formation of vapor in the vertical risers 73, 75 and 77, obstructing fins 92 are placed in the lower ends of each riser. Also, baffles 93 are provided in each chamber between the discharge of the riser and the apertured channel across which the fresh water stream flows to prevent the saline water from being carried upwardly with the vapor into the fresh water stream.

The U-shaped passages 82, 85 and 88 isolate the pressures within the various stages and are useful in starting up the operation when the fresh water is first introduced into the upper region 80 of the housing. The vapor pressure within the upper regions 83, 86 and 89 of each of the stages offers resistance to the flow of fresh water when initially starting up the system, but the build-up in the level of the upstream fresh water above each of the U-shaped passages 82, 85 and 88 forces the flow of condensates from stage to stage.

Figure 9A:
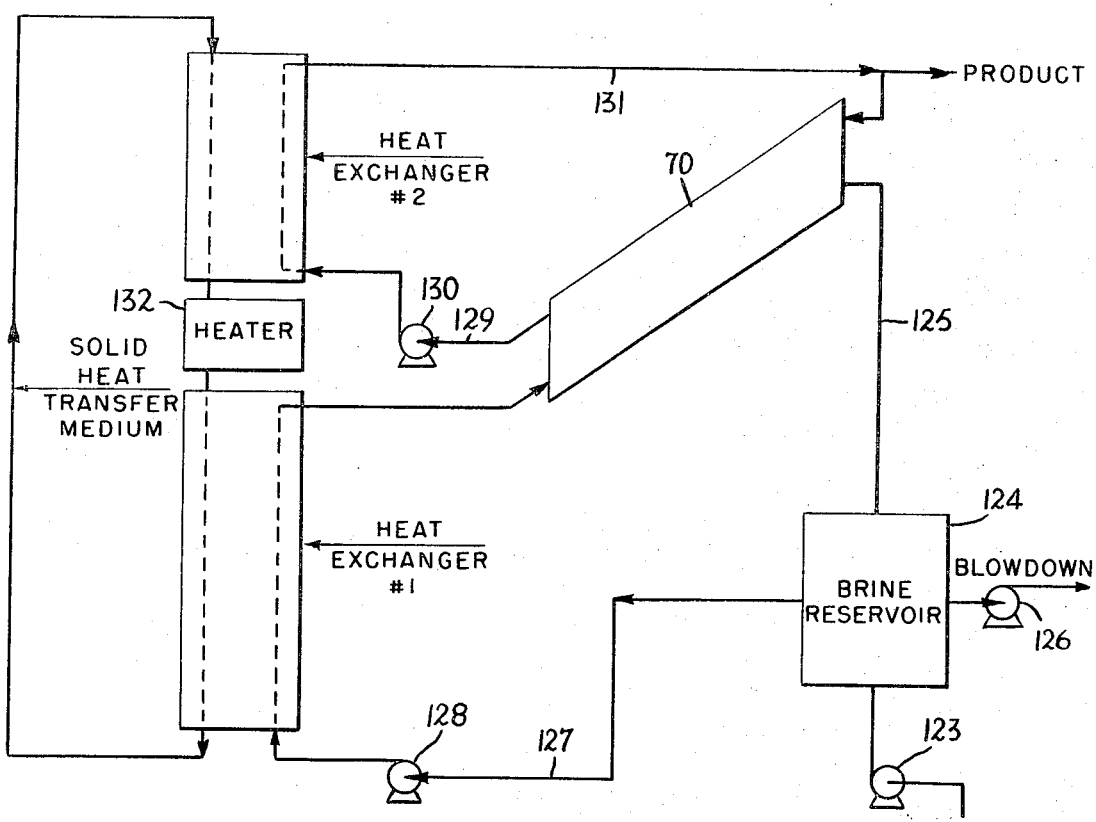
FIGS. 9A and 9B are schematic drawings illustrating an alternative system embodying the present invention.
Figure 9B:
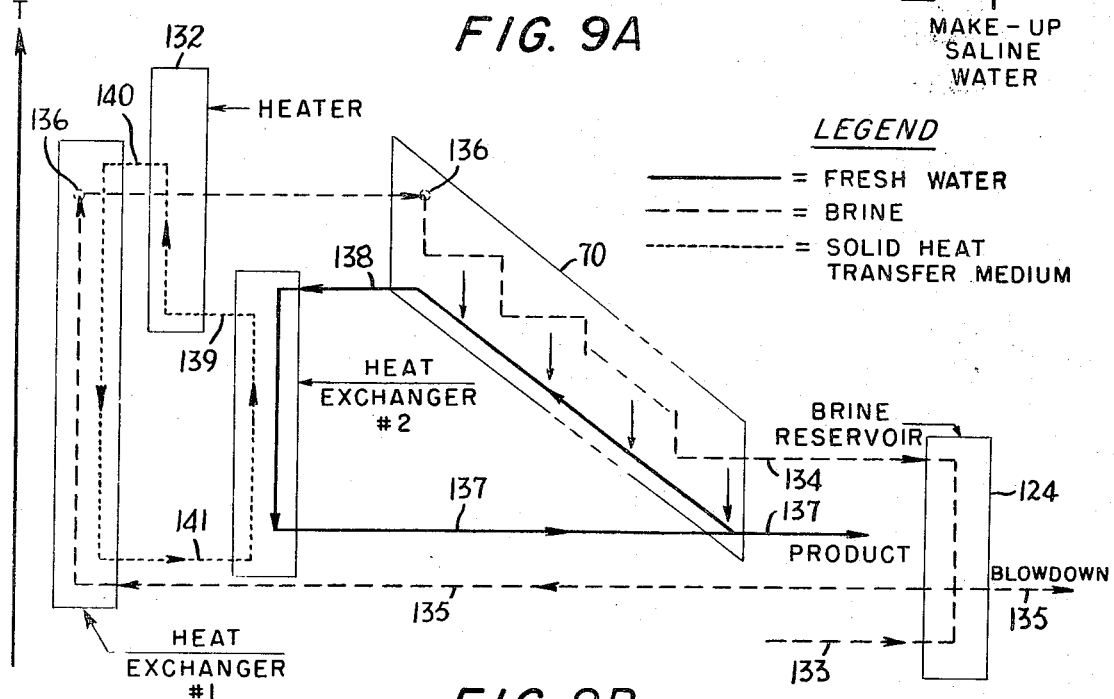

FIGS. 9A and 9B illustrate an alternative system, embodying the present invention, for transferring heat and mass from one moving stream to another. In this embodiment lower cost and increased effieciency are achieved by transferring heat from the condensate to the saline water by means of a solid heat transfer medium.

By way of explanation, in the embodiment illustrated in FIG. 1 the saline water or liquid from which the vapor is to be evolved is heated in a heat exchanger 11 in out-of-contact heat exchange relation with the condensate. The out-of-contact heat exchange relationship between the two liquids is less efficient than a direct heat exchange relation between two bodies and requires the provision of a relatively costly heat exchanger in which there is a tendency for scale to form on at least the surfaces exposed to the saline water.

FIGS. 9A and 9B show, respectively a system and the heat cycles of the saline water, the fresh water and a solid heat exchange medium in which the heat exchanger is of the type shown and described in my U.S. Pat. No. 3,242,975, issued Mar. 29, 1966, or in my copending application Ser. No. 721,990, filed Apr. 17, 1968, that is to say, a heat exchanger in which heat is transferred from one body of liquid to another by a plurality of pebbles which flow through the two bodies transferring heat from one to the other.

In the system illustrated in FIG. 9A, make-up saline water is introduced by a pump 123 into a brine reservoir 124 in which it is mixed with the hot brine returning through a conduit 125 from a multiple stage enclosure 70 similar to the one described above in connection with FIG. 8. Blowdown is discharged from the brine reservoir by a pump 126. The brine is also fed through a conduit 127 by a pump 128 into the lower end of heat exchanger No. 1 where it is heated in direct contact with heated pebbles or other solid heat transfer medium before it is introduced into the enclosure 70. In passing as the lower stream through the multiple stage enclosure 70, vapor is evolved and condensed in the upper stream flowing in countercurrent direction. The brine emerges from the enclosure and is returned by conduit 125 to the brine reservoir.

The condensate emerging from the enclosure 70 is fed through a conduit 129 by a pump 130 to the heat exchanger No. 2. In passing through the heat exchanger No. 2 the condensate is brought into direct contact with the pebbles or other solid heat transfer medium to supply heat thereto. The cooler condensate is carried from the heat exchanger No. 2 by a conduit 131 and part of it is returned to the enclosure 70 to flow therethrough as the upper stream, and part of it is taken out of the system as product.

The pebbles or other solid heat transfer medium flow by gravity first through the upper heat exchanger No. 2 in direct contact with the condensate to supply heat to the pebbles, then they pass through a heater 132 which adds heat to the system, and finally they pass by gravity through the heat exchanger No. 1 where they are in direct contact with and preheat the brine. The pebbles are then transported from the lower region of heat exchanger No. 1 to the upper region of heat exchanger No. 2, and they are washed before entering the heat exchanger No. 2.

In this system the additional heat is supplied to the system by heating the pebbles or other solid heat transfer medium rather than by preheating the brine as in the embodiment illustrated in FIG. 1, so that the problem of formation of scale on the heat exchange surfaces of the heater is avoided.

A heat exchange cycle of the system of FIG. 9A is shown in FIG. 9B. The saline water is shown entering a brine reservoir 124 at the temperature 133 and being heated therein in direct contact with the brine leaving the enclosure 70 at a temperature level 134. The blowdown leaves the brine reservoir at a temperature level 135, and the saline water entering the system, also at temperature 135, is heated to a temperature 136 in the heat exchanger No. 1 in direct contact with the pebbles or other heated solid medium. The saline water then enters the enclosure 70 at approximately the temperature level 136 and passes from stage to stage, giving off heat to the fresh water flowing through the enclosure in countercurrent direction. The brine emerges from the enclosure 70 at the temperature level 134.

The fresh water enters the enclosure 70 at a temperature level 137 and emerges therefrom at an elevated temperature 138, whereupon it is introduced into the heat exchanger No. 2 where it passes in direct contact with the pebbles or other solid heat transfer medium, emerging from the heat exchanger No. 2 at approximately the temperature level 137. Part of the fresh water is returned to the enclosure 70 and the remainder is removed from the system as product.

The solid heat transfer medium passes from the heat exchanger No. 2 at a temperature level 139, then passes through the heater 132 which raises the temperature thereof to level 140. The solid heat transfer medium then passes in direct heat exchange relationship with the saline water in the heat exchanger No. 1 to preheat the latter while at the same time decreasing the temperature of the solid heat transfer medium to the level 141, at which temperature it is introduced into the heat exchanger No. 2.

FIG. 10 illustrates a modified form of a diagonally extending housing of the type described above in connection with FIG. 8.

It will be appreciated that any noncondensable gases, such as air, which are introduced into the heat and/or mass transfer apparatus of the present invention via the lower stream will tend to rise and penetrate through the flow channel apertures into the overhead liquid stream. In the multiple stage housing shown in FIG. 8 these noncondensable gases will move through the upper stream due to their own buoyancy, and escape from the upper surfaces of this stream into the upper regions of the flow channels 83, 86 and 89. In order to ensure the proper flow of the upper stream through the enclosure 70, as well as the passage of the lower stream vapors through the apertures 84, 87 and 90, the upper regions of the flow channels 83, 86 and 89 must be maintained at a slightly lower pressure than the vapor pressures in the corresponding lower regions 78, 76 and 74. Since these vapor pressures in the lower regions are not identical, the pressures in the upper regions must similarly be separately controlled; in particular, the apparatus requires increasing pressures in the successive regions 83, 86 and 89. Although the venting of these upper regions may be easily accomplished, when the number of stages are few, by connecting a separate vacuum pump to evacuate each, it is preferable to connect all the upper regions to a single vacuum pump via a suitable network of pressure control valves when the number of stages is large. Such a system requires a careful regulation of the valve openings, however, to maintain the temperature and pressure differentials between the separate stages.

These problems involving the multiple stage housing may be avoided by constructing the upper flow channel of the housing as illustrated in FIG. 10.

FIG. 10 shows a diagonally arranged enclosure 150 provided with a inlet 151 and an outlet 152 for the lower stream and an inlet 153 and an outlet 154 for the upper stream. The liquid of the upper stream is passed from stage to stage through a flow channel 155 which is designed to maintain the flow of the liquid at a minimum velocity.

The apparatus of FIG. 10 operates in the same manner as the multiple stage housing shown in FIG. 8. The saline water enters a reservoir 156 of the enclosure 150 through the inlet 151 and passes upwards through a riser 157 to the first stage 158. Thereafter, the saline solution proceeds to the subsequent stages 160 and 162 via the risers 159 and 161, respectively, and passes out of the enclosure through the outlet 152.

In each stage the saline water releases both water vapor and noncondensable gases which were carried in by the stream through the inlet 151. These vapors and gases enter the upper stream in the channel 155 through the channel apertures and are carried by the upper stream to a reservoir 163.

The water vapors condense in the upper stream thus increasing slightly the volumetric rate of flow of the upper stream from stage to stage. The noncondensable gases which enter the upper stream appear in the form of minute bubbles, ranging in diameter from a few microns to a maximum of a few millimeters. When the upper stream is maintained at a sufficient velocity (not less than 40 centimeters per second and preferably above 70 centimeters per second) the small bubbles of the noncondensable gases are carried with the liquid stream from stage to stage before they reach its upper surface. Then, in passing through the region immediately above the apertured portion of the channel, the upper stream and the bubbles are thoroughly mixed during vapor penetration and condensation. These noncondensable gas bubbles are thus vented in a natural way from each stage to each successive stage until they reach, and are collected, in the upper region of the reservoir 163.

It is therefore possible, with the embodiment of the present invention illustrated in FIG. 10, to remove the noncondensable gases evolved in all the stages of the housing by simply connecting a vacuum pump to an outlet 164 at the upper part of the reservoir 163.

By designing the upper channel 155 with a substantially constant cross-section to avoid stagnation regions in the upper stream which would permit the collection of nonconensable gases within the channel, it is therefore possible to reduce considerably the complexity of the evacuation system. Since, further, the vapor pressure which must be maintained in the upper region of the reservoir 163 may be relatively high, the loss of condensable vapor that is evacuated together with the noncondensable gases may also be materially reduced.

FIG. 11 illustrates a modification of the multistage housing embodiment of FIG. 10. This modification is designed to prevent the liquid of the upper stream from dripping downward through the apertures into the stream below.

One of the considerations in the design of the upper sections of a heat and/or mass transfer system according to the present invention is to provide for a steady flow of liquid along the upper surface of the apertured partition without encountering the phenomenon of "weeping;" that is, the penetration of part of the upper liquid through the apertures in the partition into the liquid stream below. Especially when operating at low temperatures where the pressure differences across the partition are small, a minor amount of weeping may be encountered and may thus decrease the efficiency of the apparatus.

An improvement in performance in this respect may be achieved, according to a modification of the present invention, by replacing the straight apertured plates of the upper channel by apertured plates of a curved shape having their convex surfaces facing upwards. When following along such an apertured plate, the liquid of the upper stream is thereby constrained to follow a curvilinear path and will thus be under the influence of an upwardly directed centrifugal force. This force, though small, is sufficient to prevent the penetration of any of the upper liquid into the aperture of the partition wall.

An example of this particular modification, as applied to the embodiment of FIG. 10, is illustrated in FIG. 11. There the apertured plate 165 is so curved at the region immediately preceding the apertures that the upper stream is initially directed upwards. Thereafter the apertured plate is curved downwards again, permitting the upper stream to flow in the horizontal direction. Since the upper stream is thus caused to change its direction immediately above the apertures, there results a centrifugal force which assists in avoiding the phenomenon of weeping.

The present invention has been described herein as pertaining to the transfer of mass and/or heat from an underneath stream to an overhead stream. In the distillation of saline water both mass and heat are transferred by the condensation of the vapor evolved from the lower stream in the upper stream. In the case of a gas evolved from the lower stream which does not condense in the upper stream, there will be only a transfer of heat and not mass.

The invention is also applicable to a process in which the two streams are chemical reactants, and the transfer of mass from the lower stream to the upper stream produces a chemical reaction. Under these circumstances the process in accordance with the invention is most effective for contacting intimately a gaseous (vapor) phase with a liquid phase.

The invention has been shown in preferred form and by way of example, and obviously many modifications and variations can be made therein without departing from the spirit of the invention. For example, although the invention has been described in the form of a distillation system for saline water, it will be readily understood that the invention is applicable generally to heat and/or mass transfer between an overhead liquid stream and an underneath liquid stream from which a gas can be evolved to transmit heat and/or mass to the overhead stream. The invention should not be limited, therefore, to any particular process or apparatus except insofar as such limitations are expressly set forth in the claims.

I claim:

1. A process for transferring heat and mass from one stream of a homogeneous liquid of higher vapor pressure to another stream of a liquid of lower vapor pressure comprising the steps of flowing the liquid of lower vapor pressure along a channel which includes an apertured partition between the two streams, the liquid of lower vapor pressure flowing on top of the apertured partition, flowing solely the stream of liquid of higher vapor pressure along a channel which is separated from the apertured partition by a vapor transfer region and evolving a vapor from the liquid of higher vapor pressure to build up in the vapor transfer region beneath the apertured partition a vapor pressure higher than the pressure above the liquid of lower vapor pressure and the hydrostatic pressure of the liquid of lower vapor pressure to prevent flow of the liquid of lower vapor pressure through the apertured partition while introducing the evolved vapor into the liquid of lower vapor pressure through the apertured partition, said channel for the stream of liquid of lower vapor pressure including an upwardly sloped portion downstream of the apertured partition, the upward flow of vapor through the apertured partition lifting the stream along said upwardly sloped portion.

2. A process for transferring heat and mass from an underneath stream of a homogeneous liquid to an overhead stream of a liquid in a multistage housing comprising the steps of flowing the overhead stream of liquid along a flow channel which includes an apertured partition between the two streams in each of the stages of the housing, the overhead stream of liquid of lower vapor pressure flowing on top of the apertured partition, flowing solely the underneath stream of liquid beneath said apertured partition and beneath a vapor region intermediate the apertured partition and the underneath stream, evolving a vapor from the underneath stream of liquid in one of the stages of the housing to build up a vapor pressure in the vapor region to prevent flow of the overhead stream of liquid through the apertures and to introduce the evolved vapor into the upper stream of liquid through the apertures, flowing the vapor upwardly in that stage through the apertured partition into the overhead stream of liquid; flowing solely the underneath stream of liquid to the next stage wherein the region below the apertured partition is at lower vapor pressure to evolve additional vapor therein which is transferred upwardly from the vapor region through the apertured partition and into the overhead stream of liquid in that stage, the pressure differential of the vapor regions of adjacent stages flowing the underneath stream from stage to stage, and flowing the underneath stream from a lower to a higher stage through a riser of diverging cross-sectional area so that vapor evolved in the riser will help lift the liquid from the one stage to the other.

3. Apparatus for transferring heat and mass from a stream of a homogeneous liquid of higher vapor pressure to a stream of a liquid of lower vapor pressure through a plurality of stages comprising a multistage housing accommodating both streams, a flow channel for the stream of liquid of lower vapor pressure which includes an apertured partition dividing each stage of the housing into upper and lower sections sealed from each other save for the perforations and carrying the upper stream of liquid of lower vapor pressure through a heat and mass transferring stage of the housing, a flow channel for the stream of liquid of higher vapor pressure separated from the apertured partition by a vapor transfer region and carrying solely the stream of liquid of higher vapor pressure through the respective stage of the housing, the vapor evolved from the stream of liquid of higher vapor pressure passing through the vapor transfer region and the apertured partition into the stream of liquid of lower vapor pressure flowing thereon, the pressure differential between the vapor pressures of the two streams causing the vapor evolved from the liquid of higher vapor pressure to flow into the stream of liquid of lower vapor pressure while preventing the flow of the stream of liquid of lower vapor pressure through the apertured partition, means, separating the vapor transfer regions into a plurality of vapor transfer regions of progressively decreasing vapor pressures in the downstream direction of flow of the stream of liquid of higher vapor pressure, and a restricted passageway between the stages for the flow of the stream of liquid of higher vapor pressure from a stage in which the vapor transfer region is of higher vapor pressure to a stage in which it is at lower vapor pressure, said flow sealing the restricted passage, said channel for the liquid of lower vapor pressure including an upwardly sloped portion downstream of the apertured partition of at least one stage, the upward flow of vapor through this apertured partition lifting the stream along said upwardly sloped portion.

4. Apparatus for transferring heat and mass from a stream of a homogeneous liquid or higher vapor pressure to a stream of a liquid of lower vapor pressure through a plurality of stages comprising a multistage housing accommodating both streams, a flow channel for the stream of liquid of lower vapor pressure which includes an apertured partition dividing each stage of the housing into upper and lower sections sealed from each other save for the perforations and carrying the upper stream of liquid of lower vapor pressure through a heat and mass transferring stage of the housing, a flow channel for the stream of liquid of higher vapor pressure separated from the apertured partition by a vapor transfer region and carrying solely the stream of liquid of higher vapor pressure through the respective stage of the housing, the vapor evolved from the stream of liquid of higher vapor pressure passing through the vapor transfer region and the apertured partition into the stream of liquid of lower vapor pressure flowing thereon, the pressure differential between the vapor pressures of the two streams causing the vapor evolved from the liquid of higher vapor pressure to flow into the stream of liquid of lower vapor pressure while preventing the flow of the stream of liquid of lower vapor pressure through the apertured partition, means separating the vapor transfer regions into a plurality of vapor transfer regions of progressively decreasing vapor pressures in the downstream direction of flow of the stream of liquid of higher vapor pressure, and a restricted passageway between the stages for the flow of the stream of liquid of higher vapor pressure from a stage in which the vapor transfer region is of higher vapor pressure to a stage in which it is at lower vapor pressure, said flow sealing the restricted passage, and said stream flowing through the housing one above the other in opposite directions with the downstream direction of the underneath stream diverging from the upstream direction of the overhead stream within the housing in at least one stage.

References Cited

UNITED STATES PATENTS

| | | | |
|---|---|---|---|
| 3,337,419 | 8/1967 | Kogan | 202—173 |
| 3,427,227 | 2/1969 | Chamberlin | 202—173 |
| 3,457,143 | 7/1969 | Kunst | 202—173 X |
| 3,647,638 | 3/1972 | Osdor | 202—173 X |

JACK SOFER, Primary Examiner

U.S. Cl. X.R.

202—173; 159—2 MS, Dig. 17

PO-1050
(5/69)

UNITED STATES PATENT OFFICE
CERTIFICATE OF CORRECTION

Patent No. 3,830,706          Dated August 20, 1974

Inventor(s) A. Kogan

It is certified that error appears in the above-identified patent and that said Letters Patent are hereby corrected as shown below:

In the patent title, "VAPOUR" should read --VAPOROUS--;

Col. 1, line 10, "Oct. 10, 1971" should be --Oct. 12, 1971--;

Col. 1, line 26, delete "lower vapor pressure. The vapor evolved" and substitute therefor --higher vapor pressure to build up, in the--;

Col. 2, line 13, "containing" should read --contain--;

Col. 2, line 33, "air-evaculated" should read --air-evacuated--;

Col. 4, lines 63 and 64, "accommodate" should read --accommodated--;

Col. 5, line 30, "siturate" should read --situated--;

Col. 8, line 18, "deeping" should read --deepening--;

Col. 8, line 54, "coalescence" should read --coalesce--;

Col. 10, line 44, "pressure" should be --pressures--;

Col. 12, line 23, "condensates" should be --condensate--;

Col. 13, line 19, before "temperature" delete "the";

Col. 13, lines 67 and 68, "correspondnig" should read --corresponding--;

Col. 18, line 6, "stream" should be --streams--; and

PO-1050
(5/69)

UNITED STATES PATENT OFFICE
CERTIFICATE OF CORRECTION

Page 2

Patent No. 3,830,706  Dated August 20, 1974

Inventor(s) A. Kogan

It is certified that error appears in the above-identified patent and that said Letters Patent are hereby corrected as shown below:

Col. 18, following line 18, insert

| | | | | |
|---|---|---|---|---|
| --2,749,094 | 6/1956 | Lewis et al. | 159 | Dig. 17 |
| 3,206,380 | 9/1965 | Daviau | 203 | 11X |
| 3,242,975 | 3/1966 | Kogan | 203 | 11UX |
| 3,236,747 | 2/1966 | Margiloff | 203 | 100X |
| 3,249,517 | 5/1966 | Lockman | 202 | 173X |
| 3,298,932 | 1/1967 | Bauer | 203 | 100 |
| 3,376,204 | 4/1968 | Tidball | 159 | Dig. 17 |
| 3,417,975 | 12/1968 | Williams et al. | 261 | 114 |
| 3,442,769 | 5/1969 | Heinz | 203 | 7 |
| 3,446,711 | 5/1969 | Rosenstein et al. | 203 | 100X |
| 3,515,645 | 6/1970 | Wetch | 202 | 173 |
| 3,533,916 | 10/1970 | Newson et al. | 202 | 173 |
| 3,619,379 | 11/1971 | R. Bidard | 203 | 11X |
| 3,649,471 | 3/1972 | Kunst | 202 | 173 |

Canadian Patent No. 610,314  12/1960  Silver--.

Signed and sealed this 3rd day of December 1974.

(SEAL)
Attest:

McCOY M. GIBSON JR.
Attesting Officer

C. MARSHALL DANN
Commissioner of Patents